(12) United States Patent
Adachi (10) Patent No.: US 9,210,635 B2
(45) Date of Patent: Dec. 8, 2015

(54) RADIO BASE STATION AND HANDOVER CONTROL METHOD

(75) Inventor: Hiroyuki Adachi, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/241,000

(22) PCT Filed: Aug. 22, 2012

(86) PCT No.: PCT/JP2012/071220
§ 371 (c)(1),
(2), (4) Date: Feb. 25, 2014

(87) PCT Pub. No.: WO2013/031604
PCT Pub. Date: Mar. 7, 2013

(65) Prior Publication Data
US 2014/0220977 A1    Aug. 7, 2014

(30) Foreign Application Priority Data
Aug. 26, 2011   (JP) .................................. 2011-185331

(51) Int. Cl.
*H04W 36/00* (2009.01)
*H04W 36/22* (2009.01)
*H04W 36/26* (2009.01)

(52) U.S. Cl.
CPC .......... *H04W 36/22* (2013.01); *H04W 36/0055* (2013.01); *H04W 36/26* (2013.01)

(58) Field of Classification Search
CPC .......................... H04W 36/0055; H04W 36/22
USPC .............................. 455/436–444; 370/331–338
See application file for complete search history.

(56) References Cited

U.S. PATENT DOCUMENTS

| 2003/0002460 A1* | 1/2003 | English .......................... 370/331 |
| 2010/0189075 A1* | 7/2010 | Iwamura et al. .............. 370/331 |
| 2013/0079015 A1 | 3/2013 | Kitaji |

FOREIGN PATENT DOCUMENTS

| JP | 2000-224094 A | 8/2000 |
| JP | 2004-186953 A | 7/2004 |

(Continued)

OTHER PUBLICATIONS

3GPP TR 36.902 V9.1.0, Technical Report, Apr. 2010, Release 9, Valbonne, France.
International Search Report; PCT/JP2012/071220; Sep. 18, 2012.
(Continued)

*Primary Examiner* — Charles Shedrick
(74) *Attorney, Agent, or Firm* — Studebaker & Brackett PC (57) ABSTRACT

After a radio base station eNB10-2 receives a Handover Request message that is transmitted by a radio base station eNB10-1, for a radio terminal UE30-1 connected to the radio base station eNB10-1 to perform handover to the radio base station eNB10-2, the radio base station eNB10-2 transmits a response (Handover Request Ack message or Handover Request Nack message) to the Handover Request message to the radio base station eNB10-1. The Handover Request message includes information indicating a fulfillment level of throughput obtained when the radio terminal UE30-1 executes an application, relative to throughput required for the radio terminal UE30-1 to execute the application. The radio base station eNB10-2 controls the response to the Handover Request message, in accordance with the information indicating the fulfillment level included in the Handover Request message.

8 Claims, 5 Drawing Sheets

(56) References Cited

FOREIGN PATENT DOCUMENTS

| JP | 2005-101930 A | 4/2005 |
| JP | 2009-005385 A | 1/2009 |
| JP | 2011-259202 A | 12/2011 |

OTHER PUBLICATIONS

An Office Action; "Notice of Reasons for Rejection," issued by the Japanese Patent Office on Sep. 29, 2015, which corresponds to Japanese Patent Application No. 2014-234770 and is related to U.S. Appl. No. 14/241,000; with English language statement of relevance.

\* cited by examiner

RADIO BASE STATION AND HANDOVER CONTROL METHOD

TECHNICAL FIELD

The present invention relates to a radio communication technology, and in particular, relates to a radio base station and a handover control method that control handover by a radio terminal.

BACKGROUND ART

In LTE (Long Term Evolution) standardized in 3GPP (3rd Generation Partnership Project) which is a group aiming to standardize a radio communication system, a technology called SON (Self Organizing Network) is employed. According to the SON, it is expected to automatize the installation or maintenance of a radio base station without measurement or setting in a field by manpower (for example, see Non Patent Literature 1).

In the SON, in order to equalize a load between radio base stations (called "eNB" in the 3GPP), there has been proposed a technique of adjusting a coverage on the basis of load information transmitted and received between the radio base stations. In the technique of adjusting the coverage, at the time of handover, when there are a radio base station having a high load and a radio base station having a low load, a radio terminal connected to the radio base station having a high load is handed over to the radio base station having a low load.

CITATION LIST

Non Patent Literature

Non Patent Literature 1: 3GPP TR 36.902 V9.1.0 April, 2010.

SUMMARY OF THE INVENTION

However, in the technique of performing handover on the basis of the load information, there is the following problem. Specifically, there is a problem that even although a load of a first radio base station and a load of a second radio base station are equalized, throughput of a radio terminal connected to the first radio base station and throughput of a radio terminal connected to the second radio base station are not given consideration.

Therefore, it is an object of the present invention to provide a radio base station and a handover control method, with which it is possible to perform appropriate handover in consideration of throughput of a radio terminal.

In order to solve the aforementioned problem, the present invention has following features.

The feature of a radio base station according to the present invention is summarized as follows. A radio base station (radio base station eNB10-2) to which a radio terminal (radio terminal UE30-2) is connected, comprises: a reception unit (network communication unit 140-2) that receives a handover request (Handover Request message) that is transmitted by another radio base station (radio base station eNB10-1), for a radio terminal (radio terminal UE30-1) connected to the another radio base station to perform handover to the radio base station (radio base station eNB10-2); a transmission unit (network communication unit 140-2) that transmits a response (Handover Request Ack message or Handover Request Nack message) to the handover request to the another radio base station; and a control unit (control unit 120-2) that controls a response to the handover request, wherein the handover request includes first information indicating a fulfillment level of throughput obtained when the radio terminal connected to the another radio base station executes an application, relative to throughput required for the radio terminal to execute the application, and the control unit controls the response to the handover request, in accordance with the first information included in the handover request.

Another feature of the radio base station according to the present invention is summarized as follows. In the aforementioned feature, the control unit controls the response to the handover request, in accordance with a result of a comparison between the first information included in the handover request and second information, and the second information indicates a fulfillment level of throughput obtained when the radio terminal (radio terminal UE30-2) connected to the radio base station (radio base station eNB10-2) executes the application relative to throughput required when the radio terminal executes the application.

Another feature of the radio base station according to the present invention is summarized as follows. In the aforementioned feature, the control unit performs control to transmit a positive response (Handover Request Ack message) to the handover request, when the fulfillment level indicated by the first information included in the handover request is lower than the fulfillment level indicated by the second information.

Another feature of the radio base station according to the present invention is summarized as follows. In the aforementioned feature, the control unit performs control to transmit a negative response (Handover Request Nack message) to the handover request, when the fulfillment level indicated by the first information included in the handover request is equal to or higher than the fulfillment level indicated by the second information.

The feature of a radio base station according to the present invention is summarized as follows. A radio base station (radio base station eNB10-1) to which a radio terminal (radio terminal UE30-1) is connected, comprises: a transmission unit (network communication unit 140-1) that transmits, to another radio base station (radio base station eNB10-2), a handover request (Handover Request message) for the radio terminal (radio terminal UE30-1) connected to the radio base station (radio base station eNB10-1) to perform handover to the another radio base station, wherein the transmission unit transmits first information by including the first information in the handover request, the first information indicating a fulfillment level of throughput obtained when the radio terminal (radio terminal UE30-1) connected to the radio base station (radio base station eNB10-1) executes an application, relative to throughput required for the radio terminal to execute the application.

Another feature of the radio base station according to the present invention is summarized as follows. In the aforementioned feature, the transmission unit transmits the handover request when the fulfillment level indicated by the first information is lower than a threshold value.

The feature of a handover control method according to the present invention is summarized as follows. A handover control method in a radio base station to which a radio terminal is connected, comprises: a step of receiving a handover request that is transmitted by another radio base station, for a radio terminal connected to the another radio base station to perform handover to the radio base station; and a step of transmitting a response to the handover request to the another radio base station, wherein the handover request includes first information indicating a fulfillment level of throughput obtained when the radio terminal connected to the another radio base station executes an application, relative to throughput required for the radio terminal to execute the application, and in the transmission step, a response to the handover request is transmitted, in accordance with the first information included in the handover request.

The feature of a handover control method according to the present invention is summarized as follows. A handover control method in a radio base station to which a radio terminal is connected, comprises: a step of transmitting, to another radio base station, a handover request for the radio terminal connected to the radio base station to perform handover to the another radio base station, wherein in the transmission step, first information is transmitted by being included in the handover request, the first information indicating a fulfillment level of throughput obtained when the radio terminal connected to the radio base station executes an application, relative to throughput required for the radio terminal to execute the application.

DESCRIPTION OF THE EMBODIMENTS

Next, with reference to the drawings, the embodiment of the present invention will be described. Specifically, the description will be given in the order of (1) Overview of LTE system, (2) Configuration of radio communication system, (3) Configuration of radio base station, (4) Configuration of radio terminal, (5) Operation of radio communication system, (6) Operation and effect and (7) Other embodiments. In the drawings of the following embodiments, the same or similar reference signs are applied to the same or similar portions.

(1) Overview of LTE System

Figure 1:
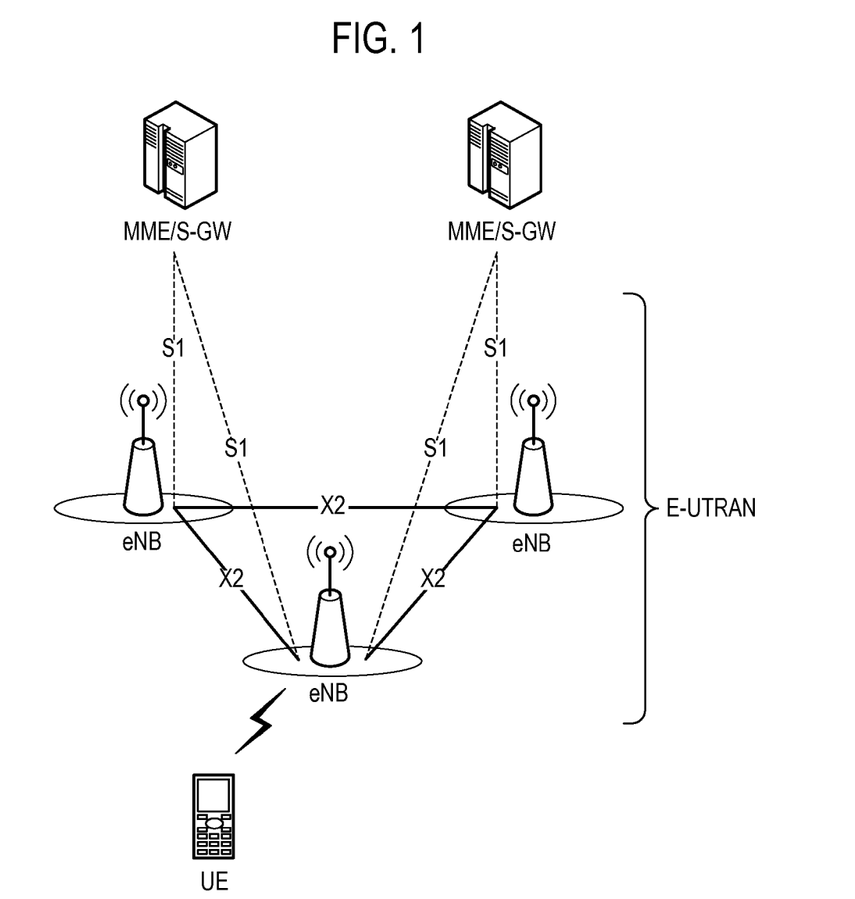
FIG. 1 is a diagram for describing an overview of an LTE system according to the embodiment of the present invention.

FIG. 1 is a diagram for describing an overview of an LTE system. As shown in FIG. 1, a plurality of radio base stations eNB configure E-UTRAN (Evolved-UMTS Terrestrial Radio Access Network). Each of the plurality of radio base stations eNB forms one or a plurality of cells, each of which is a minimum unit of a communication area where a service should be provided to the radio terminal UE.

The radio terminal UE is a radio communication device owned by a user, and is also called as "User Equipment". The radio terminal UE measures quality of a radio signal (that is, radio quality) received from the radio base station eNB, and transmits a report of a measurement result (hereinafter, a measurement result report) of the radio quality to the radio base station eNB to which the radio terminal UE is connected.

Such radio quality includes reference signal received power (RSRP), signal-to-interference noise ratio (SINR) and the like. The measurement result report related to the RSRP is called a measurement report, and the measurement result report related to an index of the SINR for each particular frequency band is called CQI (Channel Quality Indicator).

The radio base station eNB, to which the radio terminal UE is connected, performs a handover procedure for switching destinations to which the radio terminal UE is connected on the basis of the measurement report received from the radio terminal UE. When the radio terminal UE receives a reference signal from a plurality of radio base stations eNB, the measurement report includes a plurality of RSRPs corresponding to the plurality of radio base stations eNB (a plurality of cells). The radio base station eNB, to which the radio terminal UE is connected, generally selects a radio base station eNB with the highest RSRP, from among the plurality of radio base stations eNB (a plurality of cells), as the destination to which the radio terminal UE is connected.

Further, the radio base station eNB, to which the radio terminal UE is connected, assigns a resource block, which is an assignment unit of a radio resource, to the radio terminal UE on the basis of the CQI received from the radio terminal UE. Moreover, the radio base station eNB, to which the radio terminal UE is connected, determines a modulation class to be used in radio communication with the radio terminal UE, on the basis of the CQI received from the radio terminal UE. The modulation class is a combination of a modulation level and a coding rate.

The radio base stations eNB are capable of communicating with one another through an X2 interface which is a logical communication path through which it is possible to provide inter-base station communication. Each of the plurality of radio base stations eNB can communicate with EPC (Evolved Packet Core), more specifically, with MME (Mobility Management Entity)/S-GW (Serving Gateway) via an S1 interface.

(2) Configuration of Radio Communication System

Figure 2:
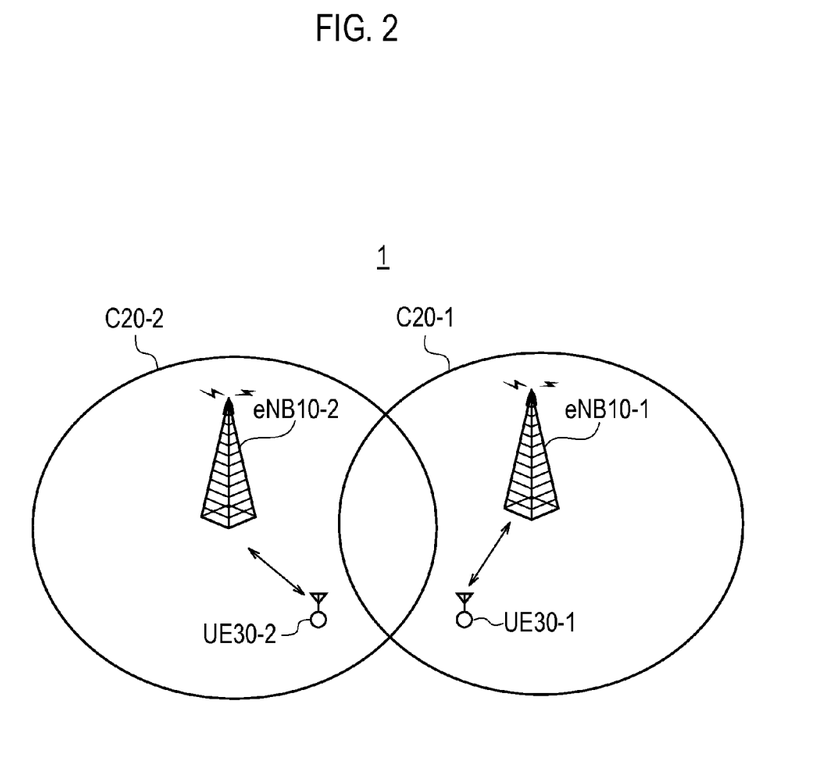
FIG. 2 is a schematic configuration diagram of a radio communication system 1 according to the embodiment of the present invention.

FIG. 2 is a schematic configuration diagram of a radio communication system 1 according to the present embodiment.

As shown in FIG. 2, the radio communication system 1 includes a radio base station eNB10-1, a radio terminal UE30-1 connected to the radio base station eNB10-1 in a cell C20-1 formed by the radio base station eNB10-1, and a radio terminal UE30-2 connected to a radio base station eNB10-2 in a cell C20-2 formed by the radio base station eNB10-2. The radio base station eNB10-1 and the radio base station eNB10-2 are able to perform inter-base station communication using the above-described X2 interface. In addition, FIG. 2 illustrates one radio terminal UE30-1 and one radio terminal UE30-2 only, respectively; however, there exist a plurality of radio terminals UE30-1 and a plurality of radio terminals UE30-2.

In the present embodiment, in addition to adjusting a handover parameter based on the above-described load information, each radio base station eNB controls a handover procedure of the radio terminal UE on the basis of the degree of throughput (hereinafter, referred to as "throughput fulfillment level") that is measured when a radio terminal UE executes an application (hereinafter, referred to as "actually measured throughput"), relative to throughput that is required when the radio terminal UE executes the application (hereinafter, referred to as "required throughput").

(3) Configuration of Radio Base Station (3.1) Configuration of Radio Base Station eNB10-1

Figure 3:
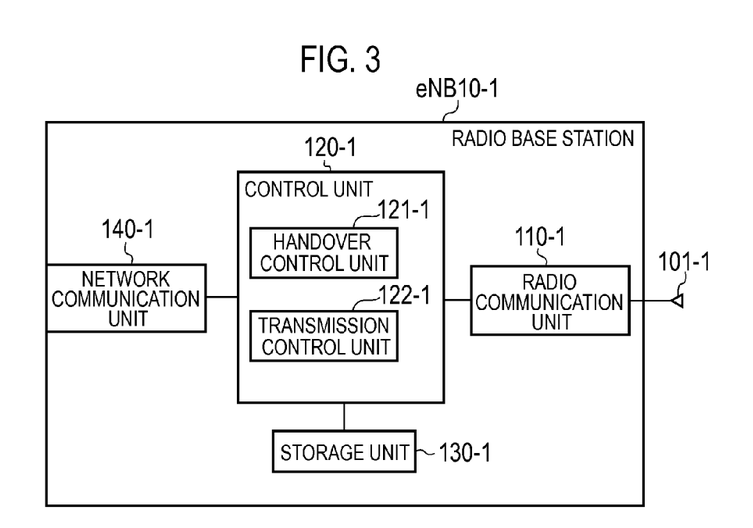
FIG. 3 is a block diagram illustrating the configuration of the radio base station eNB10-1 according to the embodiment of the present invention.

Next, the configuration of the radio base station eNB10-1 will be described. FIG. 3 is a block diagram illustrating the configuration of the radio base station eNB10-1 according to the present embodiment.

As shown in FIG. 3, the radio base station eNB10-1 includes an antenna unit 101-1, a radio communication unit 110-1, a control unit 120-1, a storage unit 130-1, and a network communication unit 140-1.

The antenna unit 101-1 is used for transmitting and receiving a radio signal. The radio communication unit 110-1 is configured by a radio frequency (RF) circuit and a baseband (BB) circuit, for example, and transmits and receives a radio signal to and from the radio terminal UE30-1 via the antenna unit 101-1. Further, the radio communication unit 110-1 modulates a transmission signal and demodulates a reception signal.

The control unit 120-1 is configured by using a CPU, for example, and controls various functions provided in the radio base station eNB10-1. The storage unit 130-1 is configured by using a memory, for example, and stores various types of information used for, for example, controlling the radio base station eNB10-1. The network communication unit 140-1 uses an X2 interface to perform inter-base station communication with another neighboring radio base station eNB10-2. Further, the network communication unit 140-1 uses an S1 interface to communicate with the EPC.

The control unit 120-1 includes a handover control unit 121-1 and a transmission control unit 122-1.

The radio communication unit 110-1 receives a throughput fulfillment level information message, which is transmitted from each radio terminal UE30-1 connected to the radio base station eNB10-1, via the antenna unit 101-1. The throughput fulfillment level information indicates the degree (throughput fulfillment level) of throughput (actually measured throughput), which is measured when the radio terminal UE30-1 (a transmission source) executes an application, relative to throughput (required throughput) which is required when the radio terminal UE30-1 executes the application. Further, the throughput generally indicates the amount of communication data per a unit time, and in the present embodiment, the throughput indicates throughput between the radio base station eNB and the radio terminal UE. The radio communication unit 110-1 outputs the received throughput fulfillment level information to the handover control unit 121-1.

The handover control unit 121-1 recognizes a throughput fulfillment level in each radio terminal UE30-1 for each radio terminal UE30-1 on the basis of the throughput fulfillment level information message input from each radio terminal UE30-1. Next, the handover control unit 121-1 calculates an average value of the recognized throughput fulfillment levels. The average value (hereinafter, referred to as a "first entire throughput fulfillment level") indicates the degree of actually measured throughput relative to entire required throughput of a plurality of the radio terminals UE30-1 connected to the radio base station eNB10-1.

The handover control unit 121-1 determines whether the first entire throughput fulfillment level is lower than a first threshold value. The first threshold value is a minimum value of the first entire throughput fulfillment level when the radio terminals UE30-1 connected to the radio base station eNB10-1 are not handed over to another radio base station eNB10-2. The first threshold value is stored in the storage unit 130-1 in advance.

When the first entire throughput fulfillment level is lower than the first threshold value, the handover control unit 121-1 recognizes that it is necessary to hand over the radio terminals UE30-1 connected to the radio base station eNB10-1 to the radio base station eNB10-2. Moreover, the handover control unit 121-1 selects some of the radio terminals UE30-1 connected to the radio base station eNB10-1 as a terminal to be handed over. For example, the handover control unit 121-1 selects, as a terminal to be handed over, a radio terminal UE30-1 in which the corresponding throughput fulfillment level is lowest among the radio terminals UE30-1 connected to the radio base station eNB10-1, or a predetermined number of radio terminals UE30-1 in which the corresponding throughput is low.

The transmission control unit 122-1 outputs, to the network communication unit 140-1, a Handover Request message, which includes information on the first entire throughput fulfillment level and which is for requesting to serve as a destination to which the radio terminal UE30-1 to be handed over is handed over. Further, the transmission control unit 122-1 controls the network communication unit 140-1 so that the Handover Request message is transmitted to the radio base station eNB10-2.

The network communication unit 140-1 transmits the Handover Request message including first entire throughput fulfillment level information to the radio base station eNB10-2 via the X2 interface, in accordance with the control of the transmission control unit 122-1.

Then, the network communication unit 140-1 receives a Handover Request Ack message (positive response) or a Handover Request Nack message (negative response), via the X2 interface, as a response from the radio base station eNB10-2 to the Handover Request message.

The handover control unit 121-1 generates a Handover command message for instructing the radio terminal UE30-1, which is to be handed over, to hand over, when the network communication unit 140-1 receives the Handover Request Ack message. Further, the handover control unit 121 outputs the Handover command message to the radio communication unit 110. The radio communication unit 110 transmits the Handover command message to the radio terminal UE30-1, which is to be handed over, via the antenna unit 101. On the other hand, the handover control unit 121-1 does not generate the Handover command message when the network communication unit 140-1 receives the Handover Request Nack message.

(3.2) Configuration of Radio Base Station eNB10-2

Figure 4:
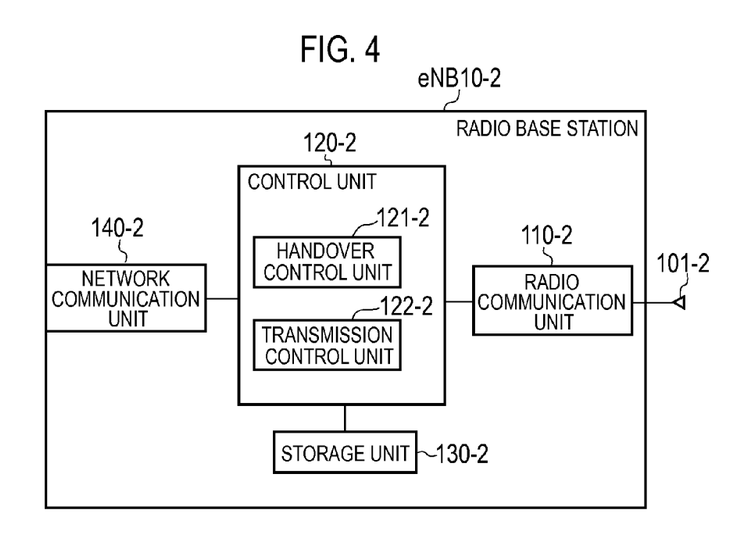
FIG. 4 is a block diagram showing the configuration of the radio base station eNB10-2 according to the embodiment of the present invention.

Next, the configuration of the radio base station eNB10-2 will be described. FIG. 4 is a block diagram showing the configuration of the radio base station eNB10-2 according to the present embodiment.

As shown in FIG. 4, the radio base station eNB10-2 includes an antenna unit 101-2, a radio communication unit 110-2, a control unit 120-2, a storage unit 130-2, and a network communication unit 140-2.

The antenna unit 101-2 is used for transmitting and receiving a radio signal. The radio communication unit 110-2 is configured by a radio frequency (RF) circuit and a baseband (BB) circuit, for example, and transmits and receives a radio signal to and from the radio terminal UE30-2 via the antenna unit 101-2. Further, the radio communication unit 110-2 modulates a transmission signal and demodulates a reception signal.

The control unit 120-2 is configured by using a CPU, for example, and controls various functions provided in the radio base station eNB10-2. The control unit 120-2 includes a handover control unit 121-2 and a transmission control unit 122-2.

The storage unit 130-2 is configured by using a memory, for example, and stores various types of information used for, for example, controlling the radio base station eNB10-2.

The network communication unit 140-2 uses the X2 interface to perform inter-base station communication with another neighboring radio base station eNB10-1. Further, the network communication unit 140-2 uses the S1 interface to communicate with the EPC.

The network communication unit 140-2 receives the Handover Request message including the first entire throughput fulfillment level information. Similarly to the above-described handover control unit 121-1 of the radio base station eNB10-1, the handover control unit 121-2 recognizes a throughput fulfillment level in each radio terminal UE30-2 for each radio terminal UE30-2 on the basis of the throughput fulfillment level information message of each radio terminal UE30-2 connected to the radio base station eNB10-2. The handover control unit 121-2 calculates an average value of each of the recognized throughput fulfillment levels. The average value (hereinafter, referred to as a "second entire throughput fulfillment level") indicates the degree of actually measured throughput relative to entire required throughput of a plurality of the radio terminals UE30-2 connected to the radio base station eNB10-2.

The network communication unit 140-2 outputs the first entire throughput fulfillment level information included in the Handover Request message to the handover control unit 122-2. Next, when the first entire throughput fulfillment level information is input, the handover control unit 121-2 determines whether the first entire throughput fulfillment level is lower than the second entire throughput fulfillment level.

In the case in which the first entire throughput fulfillment level is equal to or higher than the second entire throughput fulfillment level, when a connection destination of the radio terminal UE30-1 connected to the radio base station eNB10-1 is switched to the radio base station eNB10-2 through handover, the throughput of remaining radio terminals UE30-1 connected to the radio base station eNB10-1 may be expected to be improved. However, the throughput of the radio terminals UE30-2 connected to the radio base station eNB10-2 is likely to be further reduced because the radio terminal UE30-1 is newly connected to the radio base station eNB10-2 regardless of low throughput before the handover, so that the throughput between the radio base station eNB10-1 and the radio base station eNB10-2 is not equalized.

Therefore, when the first entire throughput fulfillment level is equal to or higher than the second entire throughput fulfillment level, the handover control unit 122-2 determines to deny the Handover Request message from the radio base station eNB10-1. In this case, the transmission control unit 122-2 outputs, as a response to the Handover Request message, the Handover Request Nack message that is a negative response, to the network communication unit 140. Further, the transmission control unit 122-2 controls the network communication unit 140-2 so that the Handover Request Nack message is transmitted to the radio base station eNB10-1. The network communication unit 140-2 transmits the Handover Request Nack message to the radio base station eNB10-1 via the X2 interface, in accordance with the control of the transmission control unit 122-2.

Meanwhile, in the case in which the first entire throughput fulfillment level is lower than the second entire throughput fulfillment level, when the connection destination of the radio terminal UE30-1 connected to the radio base station eNB10-1 is switched to the radio base station eNB10-2 through handover, the throughput of remaining radio terminals UE30-1 connected to the radio base station eNB10-1 may be expected to be improved. Further, the throughput of the radio terminals UE30-2 connected to the radio base station eNB10-2 is reduced because the radio terminal UE30-1 is newly connected to the radio base station eNB10-2, but the throughput between the radio base station eNB10-1 and the radio base station eNB10-2 can be equalized.

Therefore, when the first entire throughput fulfillment level is lower than the second entire throughput fulfillment level, the handover control unit 122-2 determines to permit the Handover Request message from the radio base station eNB10-1. In this case, the transmission control unit 122-2 outputs, as a response to the Handover Request message, the Handover Request Ack message that is a positive response, to the network communication unit 140-2. Further, the transmission control unit 122-2 controls the network communication unit 140-2 so that the Handover Request Ack message is transmitted to the radio base station eNB10-1. The network communication unit 140-2 transmits the Handover Request Ack message to the radio base station eNB10-1 via the X2 interface, in accordance with the control of the transmission control unit 122-2.

(4) Configuration of Radio Terminal

Figure 5:
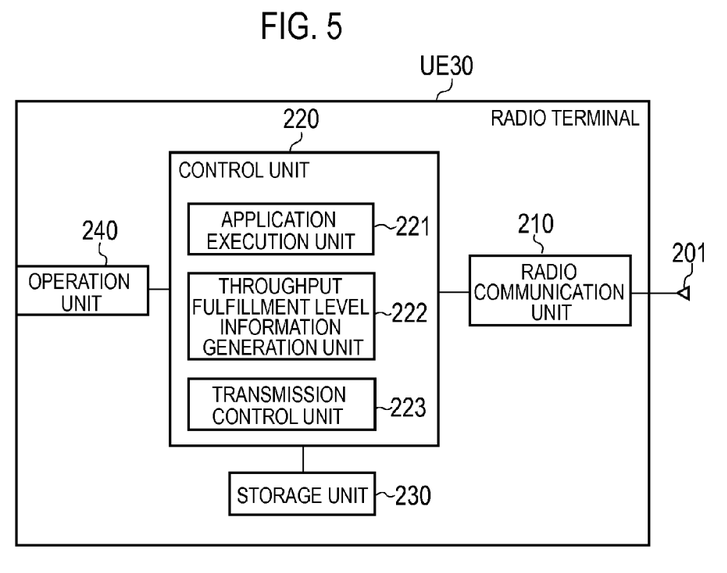
FIG. 5 is a block diagram illustrating a configuration of the radio terminal UE according to the embodiment of the present invention.

Next, the configuration of the radio terminal UE30-1 will be described. FIG. 5 is a block diagram illustrating a configuration of the radio terminal UE according to the present embodiment. The radio terminal UE30-2 also has the same configuration as that of the radio terminal UE30-1.

As shown in FIG. 5, the radio terminal UE30-1 includes an antenna unit 201, a radio communication unit 210, a control unit 220, a storage unit 230, and an operation unit 240.

The antenna unit 201 is used for transmitting and receiving a radio signal. The radio communication unit 210 includes, for example, a radio frequency (RF) circuit and a baseband (BB) circuit, and transmits and receives a radio signal to and from the radio base station eNB through the antenna unit 201. Further, the radio communication unit 210 modulates a transmission signal and demodulates a reception signal.

The control unit 220 is configured by a CPU, for example, and controls various functions of the radio terminal UE30-1. The storage unit 230 is configured by a memory, for example, and stores various types of information used for the control and the like of the radio terminal UE30-1. The operation unit 240 is configured by a numerical keypad, a function key and the like, and serves as an interface used for inputting operation content of a user.

The control unit 220 includes an application execution unit 221, a throughput fulfillment level information generation unit 222, and a transmission control unit 223.

When an operation signal corresponding to an application execution operation of the operation unit 240 by a user is input from the operation unit 240, the application execution unit 221 reads a program of an application from the storage unit 130 in accordance with the operation signal, and executes the application. Further, the application to be executed includes an application which requires radio communication with the radio base station eNB10-1, such as Web browser, streaming reproduction of video or voice, and voice communication based on VoIP.

The throughput fulfillment level information generation unit 222 acquires information on throughput (required throughput) required when the application execution unit 221 executes an application.

Specifically, the storage unit 230 stores the information on the required throughput in the execution of each application for each application executable by the radio terminal UE30-1. The throughput fulfillment level information generation unit 222 recognizes the application being executed by the application execution unit 221, and reads information on required throughput corresponding to the application from the storage unit 230.

Alternatively, a user operates the operation unit 240 and performs an operation of setting the required throughput of the application to be executed by the application execution unit 221. In this case, the throughput fulfillment level information generation unit 222 recognizes the application being executed by the application execution unit 221, and recognizes the required throughput corresponding to the application on the basis of the operation signal from the operation unit 240.

Next, the throughput fulfillment level information generation unit 222 measures throughput between the radio base station eNB10-1 and the radio terminal UE30-1 while the application is being executed by the application execution unit 221. In the present embodiment, the throughput to be measured includes both uplink throughput and downlink throughput, or either the uplink throughput or the downlink throughput.

The throughput fulfillment level information generation unit 222 divides the measured throughput (actually measured throughput) by the required throughput, thereby calculating a throughput fulfillment level. In addition, when the both the uplink throughput and the downlink throughput are measured, the throughput fulfillment level information generation unit 222 may divide actually measured uplink throughput by required uplink throughput to calculate a throughput fulfillment level in the uplink direction, divide actually measured downlink throughput by required downlink throughput to calculate a throughput fulfillment level in the downlink direction, and calculate an average value of the throughput fulfillment level in the uplink direction and the throughput fulfillment level in the downlink direction as the throughput fulfillment level. In addition, the throughput fulfillment level information generation unit 222 may convert a value, which is obtained by dividing the actually measured throughput by the required throughput, to discrete values of 1 to 10 and the like, and employ the value as the throughput fulfillment level.

The throughput fulfillment level information generation unit 222 performs weighting, which corresponds to a codec rate of data transmitted in the execution of the application, on the calculated throughput fulfillment level. Specifically, the throughput fulfillment level information generation unit 222 performs the weighting on the throughput fulfillment level such that the fulfillment level is higher as the codec rate is higher, and generates throughput fulfillment level information indicating the weighted throughput fulfillment level.

The transmission control unit 223 outputs the throughput fulfillment level information to the radio communication unit 210, and controls the radio communication unit 210 such that the throughput fulfillment level information is transmitted to the radio base station eNB10-1. The radio communication unit 210 transmits the throughput fulfillment level information to the radio base station eNB10-1 through the antenna unit 101 under the control of the transmission control unit 223.

Then, when the radio base station eNB10-1 transmits the Handover command message to the radio terminal UE30-1, the radio communication unit 110 receives the Handover command message via the antenna unit 101. Further, the radio communication unit 110 outputs the Handover command message to the control unit 220.

When the Handover command message is input, the control unit 220 performs a handover procedure for switching a connection destination from the radio base station eNB10-1 to another radio base station eNB10-2 in accordance with the Handover command message.

(5) Operation of Radio Communication System

Figure 6:
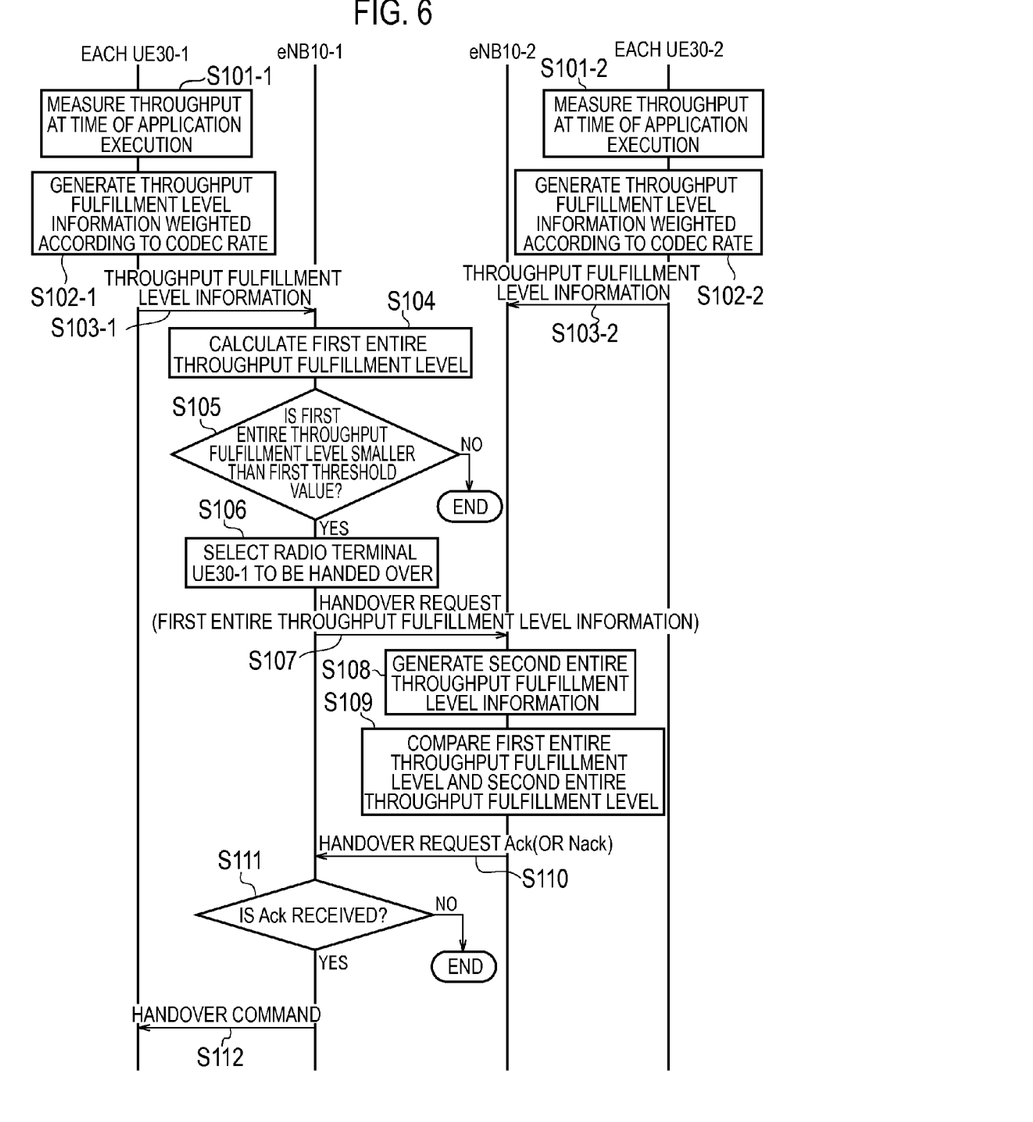
FIG. 6 is an operation sequence diagram illustrating the operation of the radio communication system 1 according to the embodiment of the present invention.

FIG. 6 is an operation sequence diagram illustrating the operation of the radio communication system 1 according to the present embodiment.

In step S101-1, the throughput fulfillment level information generation unit 222 of the radio terminal UE30-1 measures throughput at the time of execution of an application.

In step S102-1, the throughput fulfillment level information generation unit 222 of the radio terminal UE30-1 performs weighting on a throughput fulfillment level according to a codec rate, and generates throughput fulfillment level information indicating the weighted throughput fulfillment level.

In step S103-1, the radio communication unit 210 of the radio terminal UE30-1 transmits the throughput fulfillment level information to the radio base station eNB10-1 through the antenna unit 101. The radio communication unit 110-1 of the radio base station eNB10-1 receives the throughput fulfillment level information from each radio terminal UE30-1 through the antenna unit 101-1.

Likewise, in step S101-2, the throughput fulfillment level information generation unit 222 of the radio terminal UE30-2 measures throughput at the time of execution of an application.

In step S102-2, the throughput fulfillment level information generation unit 222 of the radio terminal UE30-2 performs weighting on a throughput fulfillment level according to a codec rate, and generates throughput fulfillment level information indicating the weighted throughput fulfillment level.

In step S103-2, the radio communication unit 210 of the radio terminal UE30-2 transmits the throughput fulfillment level information to the radio base station eNB10-2 through the antenna unit 101. The radio communication unit 110-2 of the radio base station eNB10-2 receives the throughput fulfillment level information from each radio terminal UE30-2 through the antenna unit 101-2.

It is noted that the procedures of steps S101 to S103 may be executed regularly, and may be executed by an instruction from the base station eNB.

In step S104, the handover control unit 121-1 of the radio base station eNB10-1 calculates the first entire throughput fulfillment level on the basis of the throughput fulfillment level information message of each radio terminal UE30-1.

In step S105, the handover control unit 121-1 of the radio base station eNB10-1 determines whether the first entire throughput fulfillment level is lower than the first threshold value. When the first entire throughput fulfillment level is equal to or higher than the first threshold value, a series of operations are completed.

Meanwhile, when the first entire throughput fulfillment level is lower than the first threshold value, the handover control unit 121-1 of the radio base station eNB10-1 selects a radio terminal UE30-1 to be handed over among radio terminals UE30-1 connected to the radio base station eNB10-1, in step S106.

In step S107, the network communication unit 140-1 of the radio base station eNB10-1 transmits the Handover Request message including the first entire throughput fulfillment level information, in accordance with the control of the transmission control unit 122-1. The network communication unit 140-2 of the radio base station eNB10-2 receives the Handover Request message including the first entire throughput fulfillment level information.

In step S108, the handover control unit 121-2 of the radio base station eNB10-2 generates (calculates) information on the second entire throughput fulfillment level on the basis of a throughput fulfillment level information message of each radio terminal UE30-2.

In step S109, the handover control unit 121-2 of the radio base station eNB10-2 compares the first entire throughput fulfillment level and the second entire throughput fulfillment level to determine whether the first entire throughput fulfillment level is lower than the second entire throughput fulfillment level.

When the first entire throughput fulfillment level is equal to or higher than the second entire throughput fulfillment level, in step S110, the network communication unit 140-2 transmits the Handover Request Nack message to the radio base station eNB10-1 via the X2 interface, in accordance with the control of the transmission control unit 122-2.

On the other hand, when the first entire throughput fulfillment level is lower than the second entire throughput fulfillment level, in step S110, the network communication unit 140-2 transmits the Handover Request Ack message to the radio base station eNB10-1 via the X2 interface, in accordance with the control of the transmission control unit 122-2.

An X2 interface communication unit 140-1 of the radio base station eNB10-1 receives the Handover Request Ack message or the Handover Request Nack message.

In step S111, the handover control unit 121-1 of the radio base station eNB10-1 determines whether the Handover Request Ack message from the radio base station eNB10-2 is received or whether the Handover Request Nack message is received. When the Handover Request Nack message from the radio base station eNB10-2 is received, a series of operations are ended.

On the other hand, when the Handover Request Ack message from the radio base station eNB10-2 is received, in step S112, the radio communication unit 110 of the radio base station eNB10-1 transmits the Handover command message to the radio terminal UE30-1 that is to be handed over, via the antenna unit 101. The radio communication unit 210 of the radio terminal UE30-1 that is to be handed over receives the Handover command message. Then, the radio terminal UE30-1 to be handed over performs a handover procedure for switching a connection destination from the radio base station eNB10-1 to the radio base station eNB10-2.

(6) Operation and Effect

As described above, according to the present embodiment, the radio base station eNB10-2 receives the Handover Request message that is transmitted by the radio base station eNB-1 for performing handover, by the radio terminal UE30-1 connected to the radio base station eNB10-1, to the radio base station eNB10-2, and thereafter, transmits a response to the Handover Request message (the Handover Request Ack message or the Handover Request Nack message) to the radio base station eNB10-1. The Handover Request message includes information indicating a fulfillment level of the throughput obtained when the radio terminal UE30-1 executes an application (first entire throughput fulfillment level), relative to the throughput required for the radio terminal UE30-1 to execute the application. The radio base station eNB10-2 controls the response to the Handover Request message, in accordance with the information indicating the fulfillment level included in the Handover Request message (first entire throughput fulfillment level). As a result, the radio base station eNB10-2 is capable of determining whether to acknowledge or deny the Handover Request message, in consideration of the throughput of the radio terminal UE30-1 connected to the radio base station eNB10-1.

In the present embodiment, the radio terminal UE30-1 performs weighting on a throughput fulfillment level such that a fulfillment level is higher as a codec rate of data to be transmitted at the time of execution of an application is higher. When the radio terminal UE30-1 executes an application for reproducing voice or a moving image, since the quality of the voice or the moving image is high as a codec rate is high, a fulfillment level of a user is high. When the fulfillment level of a user, changed according to the codec rate, is reflected in a throughput fulfillment level, it is possible to bring the throughput fulfillment level closer to a user's feeling.

(7) Other Embodiments

As described above, the present invention has been described through the embodiment. It must not be understood that, however, the discussions and drawings constituting a part of this disclosure limit the present invention. From this disclosure, various alternative embodiments, examples and operational techniques are apparent to those skilled in the art.

In the above-described embodiment, the radio terminal UE30-1 calculated a throughput fulfillment level by dividing actually measured throughput by required throughput. However, the throughput fulfillment level may be corrected as follows.

That is, when data (data to be processed) to be used in an application is transmitted from the radio base station eNB10-1, input to the storage unit 230 of the radio terminal UE30-1, and then is output, the throughput fulfillment level information generation unit 222 calculates the difference between an input speed and an output speed of the data to be processed in the storage unit 230. Moreover, when the calculated difference is in a predetermined range, even though the throughput fulfillment level calculated by dividing the actually measured throughput by the required throughput is lower than 1, the throughput fulfillment level information generation unit 222 sets the throughput fulfillment level to 1, that is, sets a throughput fulfillment level indicating that the actually measured throughput satisfies the required throughput.

Further, in the above-described embodiment, the throughput fulfillment level information generation unit 222 performs weighting corresponding to a codec rate on a value obtained by dividing the actually measured throughput by the required throughput. However, the weighting may not be performed.

Further, in the above-described embodiment, the radio base station eNB10 calculates the entire throughput fulfillment level, which indicates an entire throughput fulfillment level of each radio terminal UE30, and performs a handover procedure on the basis of the entire throughput fulfillment level. However, the radio base station eNB10 may perform a handover procedure of a single radio terminal UE30-1 on the basis of throughput fulfillment level information of the single radio terminal UE30.

In addition, in LTE-Advanced, a relay node, which is a radio base station configuring a backhaul in a radio manner, is planned to be employed, and an X2 interface is planned to be employed in the relay node. Therefore, the relay node may be used as a second radio base station according to the present invention.

In the above-described embodiment, the case, in which the backhaul is the X2 interface, was described. However, even when the backhaul is an S1 interface or the backhaul is the X2 interface and the S1 interface, the present invention can be applied in the same manner.

Moreover, in the above-described embodiment, the LTE system was described. However, the present invention may also be applied to a radio communication system based on WiMAX (IEEE 802.16), or other radio communication systems.

Note that the entire content of the Japanese Patent Application No. 2011-185331 (filed on Aug. 26, 2011) is incorporated herein by reference.

INDUSTRIAL APPLICABILITY

As mentioned above, the present invention is useful in radio communication such as mobile communication, with which it is possible to perform appropriate handover in consideration of throughput of a radio terminal.

The invention claimed is:

1. A radio base station to which a radio terminal is connected, comprising:
   a receiver that receives a handover request that is transmitted by another radio base station, for a radio terminal connected to the another radio base station to perform handover to the radio base station;
   a transmitter that transmits a response to the handover request to the another radio base station; and
   a control unit that controls a response to the handover request, wherein
   the handover request includes first information indicating a fulfillment level of throughput actually measured when the radio terminal connected to the another radio base station executes an application, divided by throughput required for the radio terminal to execute the application, and
   the control unit controls the response to the handover request, in accordance with the first information included in the handover request.

2. The radio base station according to claim 1, wherein
   the control unit controls the response to the handover request, in accordance with a result of a comparison between the first information included in the handover request and second information, and
   the second information indicates a fulfillment level of throughput obtained when the radio terminal connected to the radio base station executes the application relative to throughput required when the radio terminal executes the application.

3. The radio base station according to claim 2, wherein
   the control unit performs control to transmit a positive response to the handover request, when the fulfillment level indicated by the first information included in the handover request is lower than the fulfillment level indicated by the second information.

4. The radio base station according to claim 2, wherein
   the control unit performs control to transmit a negative response to the handover request, when the fulfillment level indicated by the first information included in the handover request is equal to or higher than the fulfillment level indicated by the second information.

5. A radio base station to which a radio terminal is connected, comprising:
   a transmitter that transmits, to another radio base station, a handover request for the radio terminal connected to the radio base station to perform handover to the another radio base station, wherein
   the transmitter transmits first information by including the first information in the handover request, the first information indicating a fulfillment level of throughput actually measured when the radio terminal connected to the radio base station executes an application, divided by throughput required for the radio terminal to execute the application.

6. The radio base station according to claim 5, wherein
   the transmission unit transmits the handover request when the fulfillment level indicated by the first information is lower than a threshold value.

7. A handover control method in a radio base station to which a radio terminal is connected, comprising:
   a step of receiving a handover request that is transmitted by another radio base station, for a radio terminal connected to the another radio base station to perform handover to the radio base station; and
   a step of transmitting a response to the handover request to the another radio base station, wherein
   the handover request includes first information indicating a fulfillment level of throughput actually measured when the radio terminal connected to the another radio base station executes an application, divided by throughput required for the radio terminal to execute the application, and
   in the transmission step, a response to the handover request is transmitted, in accordance with the first information included in the handover request.

8. A handover control method in a radio base station to which a radio terminal is connected, comprising:
   a step of transmitting, to another radio base station, a handover request for the radio terminal connected to the radio base station to perform handover to the another radio base station, wherein
   in the transmission step, first information is transmitted by being included in the handover request, the first information indicating a fulfillment level of throughput actually measured when the radio terminal connected to the radio base station executes an application, divided by throughput required for the radio terminal to execute the application.

* * * * *